US008814280B2

(12) United States Patent
Yeh et al.

(10) Patent No.: US 8,814,280 B2
(45) Date of Patent: Aug. 26, 2014

(54) PROPORTIONALLY CONTROLLABLE HYDRAULIC BRAKE SYSTEM

(75) Inventors: Te-Ming Yeh, Taoyuan County (TW); Chuen-An Chen, Taoyuan County (TW); Min-Fang Lo, Taoyuan County (TW); Che-Pin Chen, New Taipei (TW); Min-Hua Shih, Taoyuan County (TW)

(73) Assignee: Chung-Shan Institute of Science and Technology, Armaments, Bureau, Ministry of National Defense, Taoyuan County (TW)

(*) Notice: Subject to any disclaimer, the term of this patent is extended or adjusted under 35 U.S.C. 154(b) by 291 days.

(21) Appl. No.: 13/313,131

(22) Filed: Dec. 7, 2011

(65) Prior Publication Data

US 2013/0147261 A1   Jun. 13, 2013

(51) Int. Cl.
*B60T 8/36* (2006.01)

(52) U.S. Cl.
USPC .................. 303/119.2; 303/113.2; 303/119.3

(58) Field of Classification Search
None
See application file for complete search history.

(56) References Cited

U.S. PATENT DOCUMENTS

| 6,354,674 | B1 * | 3/2002 | Iwamoto et al. | 303/119.3 |
| 2004/0046446 | A1 * | 3/2004 | Dinkel et al. | 303/119.3 |
| 2004/0056529 | A1 * | 3/2004 | Otto | 303/119.3 |
| 2004/0090115 | A1 * | 5/2004 | Inoue et al. | 303/119.3 |
| 2004/0160120 | A1 * | 8/2004 | Weh et al. | 303/119.3 |
| 2005/0052078 | A1 * | 3/2005 | Kondo | 303/119.3 |
| 2005/0057093 | A1 * | 3/2005 | Segawa et al. | 303/119.3 |
| 2005/0146210 | A1 * | 7/2005 | Hinz et al. | 303/119.3 |
| 2005/0253451 | A1 * | 11/2005 | Hinz et al. | 303/119.3 |
| 2006/0138860 | A1 * | 6/2006 | Hinz et al. | 303/119.3 |
| 2007/0040445 | A1 * | 2/2007 | Otto | 303/119.3 |
| 2007/0096553 | A1 * | 5/2007 | May et al. | 303/119.3 |
| 2007/0228820 | A1 * | 10/2007 | Nakamura | 303/119.3 |
| 2008/0106145 | A1 * | 5/2008 | Hinz et al. | 303/152 |
| 2010/0032597 | A1 * | 2/2010 | Beer | 251/129.01 |

* cited by examiner

*Primary Examiner* — Robert A Siconolfi
*Assistant Examiner* — James Hsiao
(74) *Attorney, Agent, or Firm* — Jackson IPG PLLC

(57) ABSTRACT

A hydraulic brake system includes a body with cavities, a vacuum brake booster port, a first caliber port and a channel system defined therein. An accumulator is located in a first one of the cavities. A first proportional solenoid valve is located in a second one of the cavities. A traction control valve is located in a third one of the cavities. The channel system is connected to the accumulator, the first proportional solenoid valve and the traction control valve via the first, second and third cavities. The channel system is further connected to the vacuum brake booster port and the first caliber port. The vacuum brake booster port, the accumulator, the first proportional solenoid valve, the traction control valve and the channel system are used together to control brake fluid to exert a first baking force on the first caliber port.

6 Claims, 7 Drawing Sheets

PROPORTIONALLY CONTROLLABLE HYDRAULIC BRAKE SYSTEM

BACKGROUND OF INVENTION

1. Field of Invention

The present invention relates to a hydraulic brake and, more particularly, to a simple and reliable proportionally controllable hydraulic brake system.

2. Related Prior Art

A hydraulic brake system is essential for a car. For a car with four wheels, the hydraulic brake system generally includes a hydraulic pump for pumping brake fluid for example to four hydraulic cylinders each for driving a brake to slow down a related one of the wheels. Thus, a brake force is provided to each of the wheels from a related one of the brakes. The brake forces must be balanced to avoid any considerable difference between the brake forces on the right wheels and the brake forces on the left wheels that would otherwise cause the car to bias. Moreover, the braking forces must be kept below a limit to avoid lock of the wheels that would otherwise cause the car to skid.

Various devices have been devised to control the operation of the brake systems. For example, there are electric brake force distributors ("EBD"), traction control systems ("TCS") and anti-lock brake systems ("ABS"). These devices are used to improve the efficiency and effectiveness of the operation of the brake systems to prevent bias or skid of cars.

Referring to FIG. 1, a conventional skid-proof hydraulic brake system 1 includes a body 10 with channels defined therein. The skid-proof hydraulic brake system 1 further includes two inlet valves 11, two outlet valves 12, an accumulator 13, a pilot valve 14, a reversible valve 15, a vacuum brake booster port 100 and a caliper port 102 on each of two halves of the body 10 divided by a midline C. The vacuum brake booster port 100 is used for connection to a vacuum brake booster (not shown). The caliper port 102 is used for connection to calipers (not shown).

The four inlet valves 11, four outlet valves 12, two pilot valves 14 and two reversible valves 15 are necessitated by various modes of hydraulic pressure provided by the TCS, ABS or EBD. Hence, the number of the elements of the skid-proof hydraulic brake system 1 is large. It is difficult and expensive to make the channels in the body 10. Moreover, it is difficult and expensive to connect the four inlet valves 11, four outlet valves 12, two pilot valves 14 and two reversible valves 15 to the body 10. The large number of the elements renders the skid-proof hydraulic brake system 1 bulky and unreliable.

The present invention is therefore intended to obviate or at least alleviate the problems encountered in prior art.

SUMMARY OF INVENTION

It is the primary objective of the present invention to provide a simple and reliable proportionally controllable hydraulic brake system.

To achieve the foregoing objective, the hydraulic brake system includes a body, an accumulator, a first proportion and a traction control valve. The body includes cavities, a vacuum brake booster port, a first caliper port and a channel system defined therein. The accumulator is located in a first one of the cavities. The first proportional solenoid valve is located in a second one of the cavities. The traction control valve is located in a third one of the cavities. The channel system is connected to the accumulator, the first proportional solenoid valve and the traction control valve via the first, second and third cavities. The channel system is further connected to the vacuum brake booster port and the first caliper port. The vacuum brake booster port, the accumulator, the first proportional solenoid valve, the traction control valve and the channel system are used together to control brake fluid to exert a first baking force on the first caliper port.

In an aspect, the hydraulic brake system further includes a second proportional solenoid valve located in a fourth one of the cavities so that the channel system is connected to the second proportional solenoid valve via the fourth cavity.

In another aspect, the body further includes a second caliber port connected to the channel system. The vacuum brake booster port, the accumulator, the second proportional solenoid valve, the traction control valve and the channel system can be used together to control the brake fluid to exert a second braking force on the second caliper port.

In another aspect, the first and second caliper ports are located on different faces of the body.

In another aspect, the first traction control valve includes a first upper channel, a first middle channel and a first lower channel connected to the channel system. The first proportional solenoid valve includes a second upper channel, a second middle channel and a second lower channel connected to the channel system.

In another aspect, the first upper, middle and lower channels are located on a first side of the traction control valve.

In another aspect, the second upper channel, the second middle channel and the second lower channel are located on the first side of the first proportional solenoid valve.

In another aspect, the hydraulic brake system is connected to two of the first upper, middle and lower channels according to an operative mode of the hydraulic brake system.

In another aspect, the hydraulic brake system is connected to two of the second upper, middle and lower channels according to an operative mode of the hydraulic brake system.

In another aspect, the operative mode is selected from the group consisting of an electric brake force distributor, a traction control system and an anti-lock brake system.

In another aspect, the hydraulic brake system further includes a motor located in the body and a pump located in the body and connected to the motor and the accumulator. The motor drives the pump to suck the brake fluid from the accumulator based on an operative mode of the hydraulic brake system.

In another aspect, the hydraulic brake system further includes a vibration damper chamber defined in the body. The vibration damper chamber is connected to the pump and the channel system. The pump pumps the brake fluid into the vibration damper chamber and from the vibration damper chamber into the channel system.

In another aspect, the first proportional solenoid valve includes a thread engaged with a thread formed on a wall of the second cavity.

In another aspect, the traction control valve includes a thread engaged with a thread formed on a wall of the third cavity.

Other objectives, advantages and features of the present invention will be apparent from the following description referring to the attached drawings.

BRIEF DESCRIPTION OF DRAWINGS

The present invention will be described via detailed illustration of three embodiments versus the prior art referring to the drawings wherein.

DETAILED DESCRIPTION OF EMBODIMENTS

Figure 1:
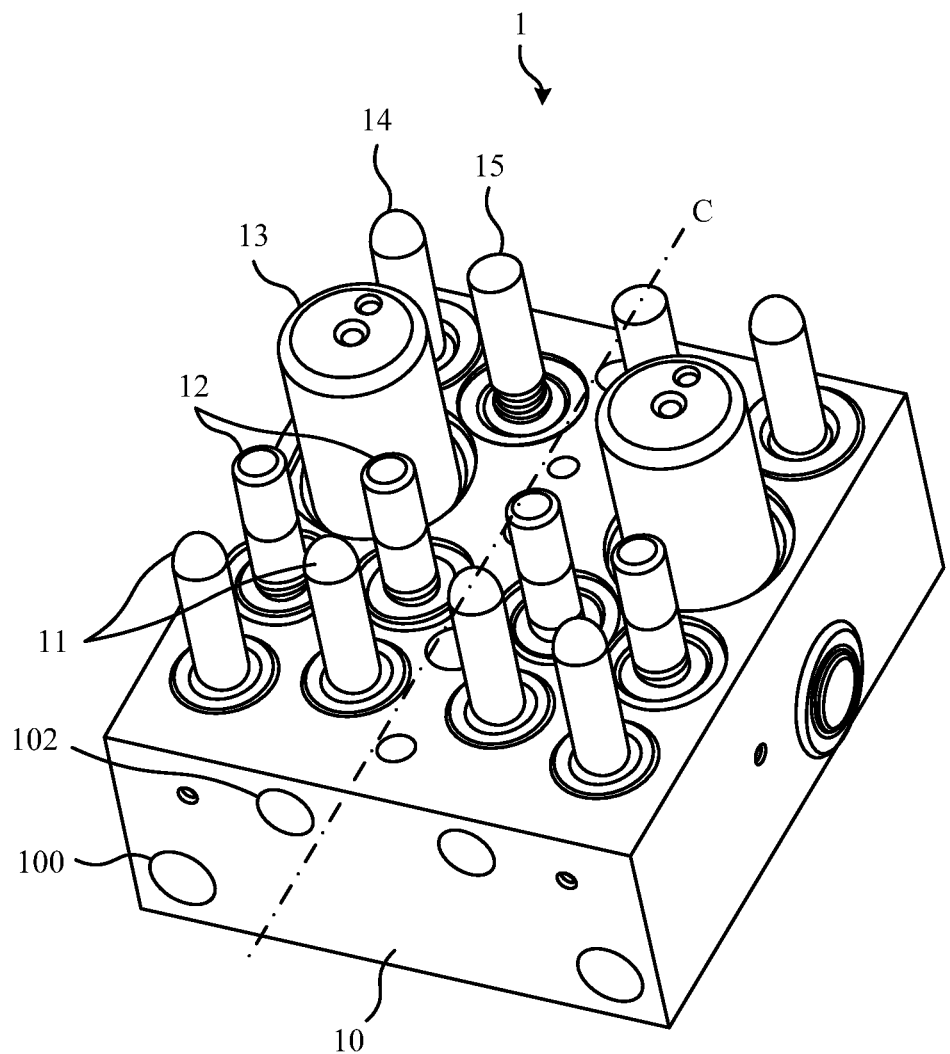
FIG. 1 is a perspective view of a conventional hydraulic brake system.

Referring to FIGS. 2 through 5, shown is a hydraulic brake system 2 according to a first embodiment of the present invention. The hydraulic brake system 2 includes a body 20, two accumulators 22, two first proportional solenoid valves 24, two second proportional solenoid valves 24' and two traction control valves 26.

Figure 2:
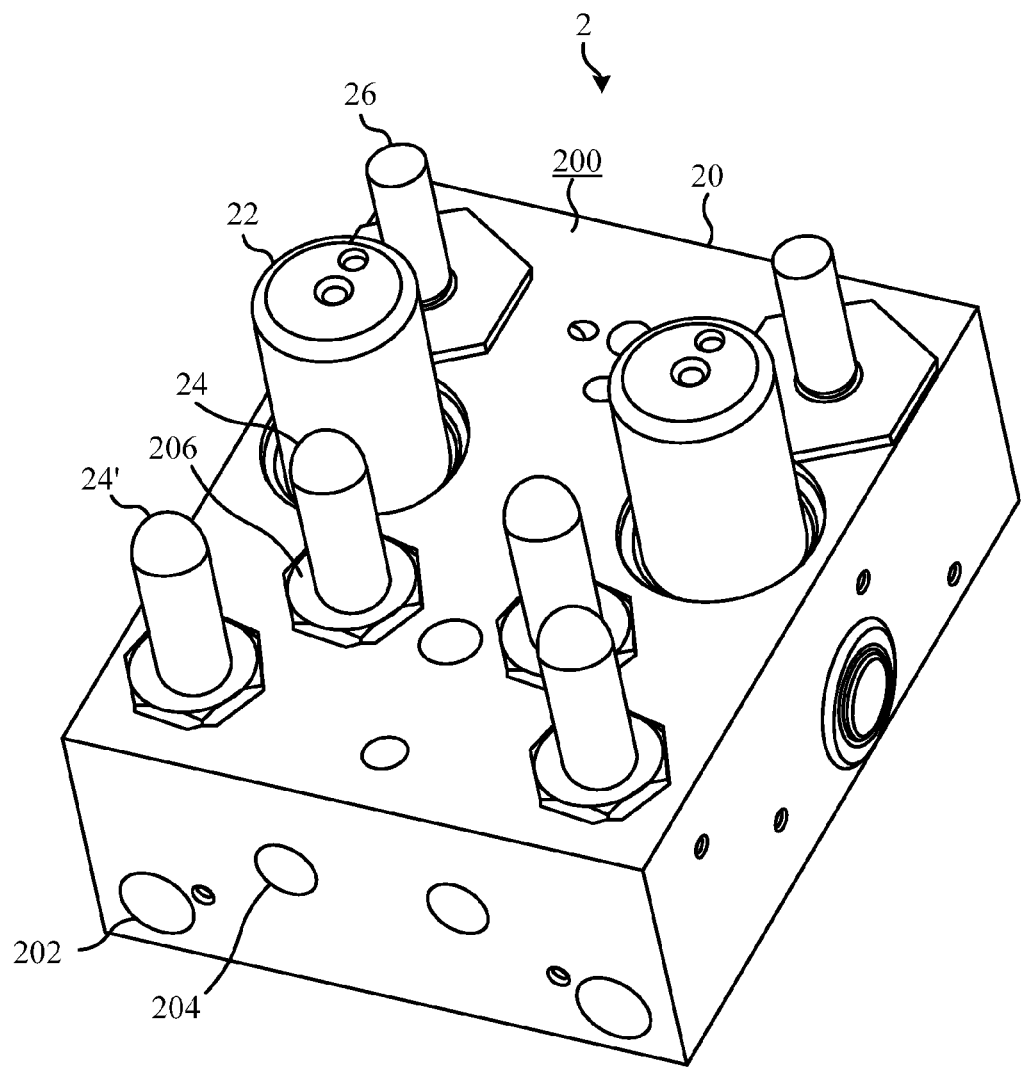
FIG. 2 is a perspective view of a hydraulic brake system according to the first embodiment of the present invention.

Referring to FIG. 2, the body 20 includes an upper face 200, a lower face, four sides extending between the upper and lower faces, and cavities 206 defined in the upper face 200. The accumulators 22, the first proportional solenoid valves 24, the second proportional solenoid valves 24' and the traction control valves 26 are located in the cavities 206.

The body 20 includes two halves. In each of the halves of the body 20 are located one of the accumulators 22, one of the first proportional solenoid valves 24, one of the second proportional solenoid valves 24' and one of the two traction control valves 26.

Figure 3:
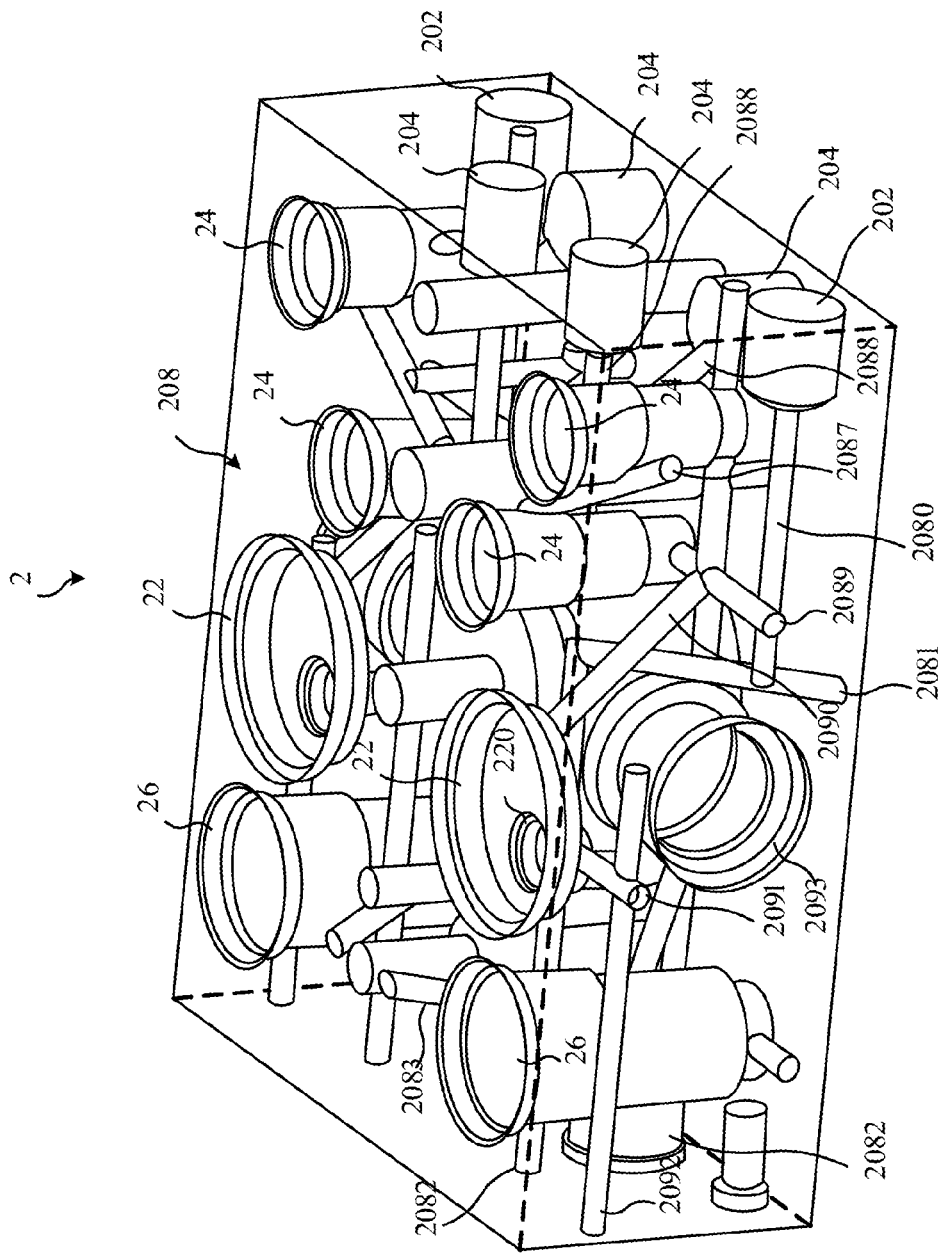
FIG. 3 is a perspective view for showing channels defined in the hydraulic brake system shown in FIG. 2.
Figure 4:
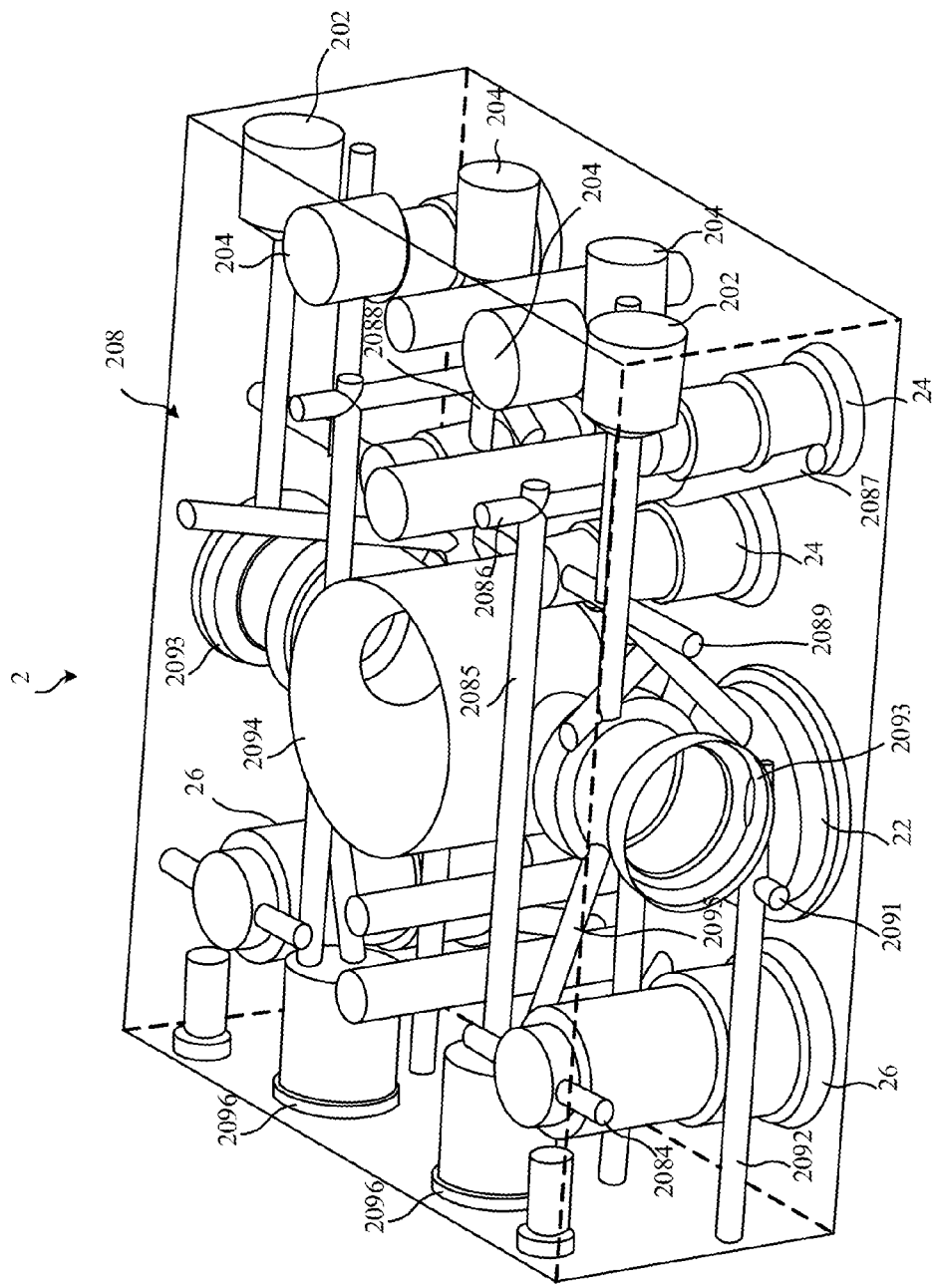
FIG. 4 is another perspective view of the hydraulic brake system shown in FIG. 2.

Referring to FIGS. 3 and 4, each of the halves of the body 20 includes a vacuum brake booster port 202, a first caliper port 204, channels 2081, 2082, 2083, 2084, 2085, 2086, 2087, 2088, 2089, 2090, 2091, 2092 and 2095, a pump port, and a vibration damper chambers 2096 defined therein. The body 20 further includes a motor port defined therein. Thus, the two channels 2081, the two channels 2082, the two channels 2083, the two channels 2084, the two channels 2085, the two channels 2086, the two channels 2087, the two channels 2088, the two channels 2089, the two channels 2090, the two channels 2091, the two channels 2092, the two pump ports, the two channels 2095, the two vibration damper chambers 2096 and the single motor port together form a channel system 208.

The accumulators 22, the first proportional solenoid valve 24 and the traction control valves 26, which are located in the cavities 206, are connected to one another through the channel system 208. The channel system 208 is in communication with the vacuum brake booster ports 202 and the first caliper ports 204.

The following description will be given to only one of the halves of the body 20 and a half of the channel system 208 except the motor port for briefness and clarity unless otherwise described.

The first caliper port 204 is connected to a caliper (not shown), and the caliper is connected to a wheel of a car (not shown). The vacuum brake booster port 202 is connected to a vacuum brake booster (not shown) so that the hydraulic brake system 2 receives brake fluid due to the operation of the vacuum brake booster.

The vacuum brake booster port 202 is in communication with the channel 2080. The vacuum brake booster is connected to the traction control valve 26 through the vacuum brake booster port 202 and the channels 2080, 2081, 2082 and 2083.

Figure 5:
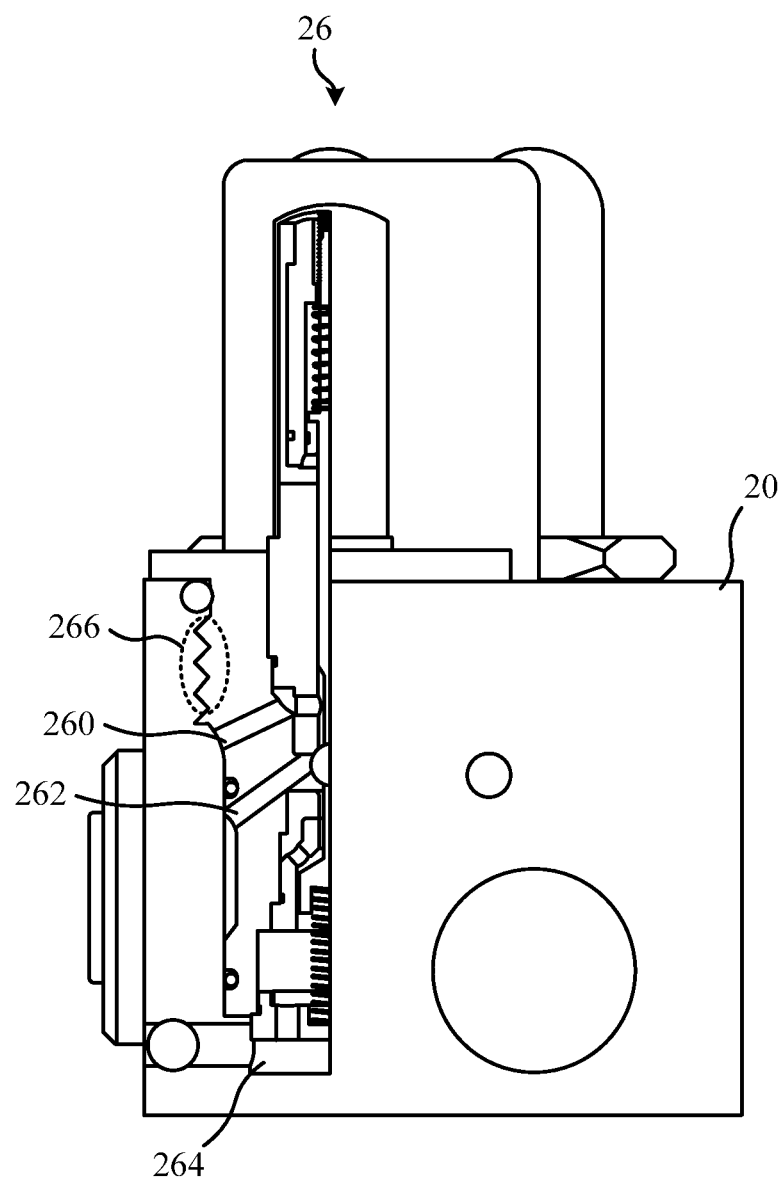
FIG. 5 is a cross-sectional view of the hydraulic brake system shown in FIG. 2.

Referring to FIG. 5, the traction control valve 26 includes a first upper channel 260, a first middle channel 262 and a first lower channel 264. The channel 2083 is in communication with the first middle channel 262 defined in the traction control valve 26. That is, the vacuum brake booster port 202 is in communication with the first middle channel 262 defined in the traction control valve 26.

Referring to FIG. 3, it should be noted that the connection of the channel 2082 to the channel 2083 is blocked by the traction control valve 26. The connection of the traction control valve 26 to the channel 2083 is also blocked by the traction control valve 26.

The first lower channel 264 defined in the traction control valve 26 shown in FIG. 5 can be connected to the channel 2084 shown in FIG. 4. The channel 2084 is in communication with the channel 2085. The channel 2085 is in communication with the channel 2086. The channel 2086 is further in communication with the channel 2087. The channel 2087 is further in communication with the first proportional solenoid valve 24.

Similarly, the first proportional solenoid valve 24 is includes an upper channel, a middle channel and a lower channel defined therein. The channel 2086 is in communication with the upper channel defined in the first proportional solenoid valve 24. That is, the first lower channel 264 defined in the traction control valve 26 is in communication with the upper channel defined in the first proportional solenoid valve 24 through channels 2084, 2085, 2086 and 2087. Moreover, the middle channel defined in the first proportional solenoid valve 24 is in communication with the first caliper port 204 through the channel 2088.

The hydraulic brake system 2 can be used in a car or any other proper vehicle. When a brake-assisting device such as TCS and EBD is not activated, the first middle channel 262 defined in the traction control valve 26 is connected to the first lower channel 264, and the upper channel defined in the first proportional solenoid valve 24 is connected to the middle channel defined in the first proportional solenoid valve 24. Therefore, as the brake system is activated, i.e., when a related brake pedal is hit, the vacuum brake booster produces pressure to force the brake fluid into the first caliper port 204 through the vacuum brake booster port 202, the channel system 208, the traction control valve 26 and the first proportional solenoid valve 24. Thus, the wheel is stopped by the caliper connected to the first caliper port 204.

When the braking is terminated, e.g., the brake pedal is released, the vacuum brake booster stops producing pressure so that an excessive amount of the brake fluid returns to the vacuum brake booster to stop the operation of the caliper.

The lower channel defined in the first proportional solenoid valve 24 can be connected to the channel 2089, the channel 2089 can be connected to the channel 2090, and the channel 2090 can be connected to the accumulator 22. The accumulator 22 includes a check valve 220 to avoid reverse pressure. The check valve 220 is connected to the channel 2091, the channel 2091 is connected to the channel 2092, and the channel 2092 is connected to the first upper channel 260 defined in the traction control valve 26 and a pump 2093 located in the pump port. The pump located in the pump port 2093 is connected to a motor 2094 located in the motor port. The motor 2094 is used to drive the pump 2093 to suck the brake fluid in a reciprocated manner.

As the hydraulic brake system 2 is used together with EBD for example, the upper channel defined in the first proportional solenoid valve 24 is connected to the lower channel defined in the first proportional solenoid valve 24. Hence, the brake fluid that returns into the first proportional solenoid valve 24 enters the accumulator 22 via the channels 2089 and 2090. The motor 2094 drives the pump 2093 to suck the brake fluid in a reciprocated manner. Therefore, an excessive amount of the brake fluid goes from the accumulator 22 into the pump 2093 through the check valve 220 and the channels 2091 and 2092.

Moreover, the channel 2095 is connected to the pump 2093 and the vibration damper chamber 2096, and the vibration damper chamber 2096 is connected to the channel 2085. Hence, the brake fluid that enters the pump 2093 enters the traction control valve 26 via the channel 2095, the vibration damper chamber 2096, the channels 2085 and 2084 and the first lower channel 264, and finally enters the hydraulic brake system 2 for repeated use.

As hydraulic brake system 2 is operated together with TCS for example, the first middle channel 262 defined in the traction control valve 26 is blocked from the first lower channel 264 defined in the traction control valve 26 while the first upper channel 260 is connected to the first middle channel 262. Now, the motor 2094 drives the pump 2093 to increase the pressure so that the brake fluid that has reached the pump 2093 enters the first proportional solenoid valve 24 via the channel 2095, the vibration damper chamber 2096 and the channels 2085, 2086 and 2087 and then enters the first caliper port 204 from the first proportional solenoid valve 24. Thus, the wheel is stopped by the caliper connected to the first caliper port 204 while the car is stabilized.

Referring to FIGS. 3 and 4, the second proportional solenoid valve 24' is connected to the second caliper port 204' to control another wheel. Similarly, the second proportional solenoid valve 24' is connected to the traction control valve 26 via the channels 2087, 2086, 2085 and 2084. Moreover, the second proportional solenoid valve 24' is connected to the second caliper port 204' via the channel 2088' so that the related wheel is stopped by the caliper connected to the second caliper port 204. It should be noted that the first caliper port 204 and the caliper 204' are located on different faces of the body 20 in the first embodiment but the first caliper port 204 and the second caliper port 204' can be located on a same face of the body 20 based on a user's need or a designer's discretion. The present invention is not limited in this regard.

When a brake-assisting device is used together with the brake system 2, the operation of the second proportional solenoid valve 24' and the second caliper port 204' and the travel of the brake fluid therein are similar to that of the first proportional solenoid valve 24 and the first caliper port 204. Hence, the hydraulic brake system 2 can synchronously exert braking forces on the wheels via the first proportional solenoid valve 24, the first caliper port 204, the second proportional solenoid valve 24' and the second caliper port 204'.

Referring to FIG. 5, the traction control valve 26 includes a thread 266 formed thereon. The thread 266 of the traction control valve 26 is engaged with a thread formed on the wall of the related cavity 206 so that the traction control valve 26 is kept in the related cavity 206. Moreover, the first upper channel 260, the first middle channel 262 and the first lower channel 264 of the traction control valve 26 are located on a same side of the traction control valve 26. Thus, there is no interference with an armature and coils of the traction control valve 26 to improve the yield and reliability of the traction control valve 26. Similarly, the channels of the first and second proportional solenoid valves 204 and 204' may be similar to those of the traction control valve 26 based on the user's need or the designer's discretion.

Figure 6:
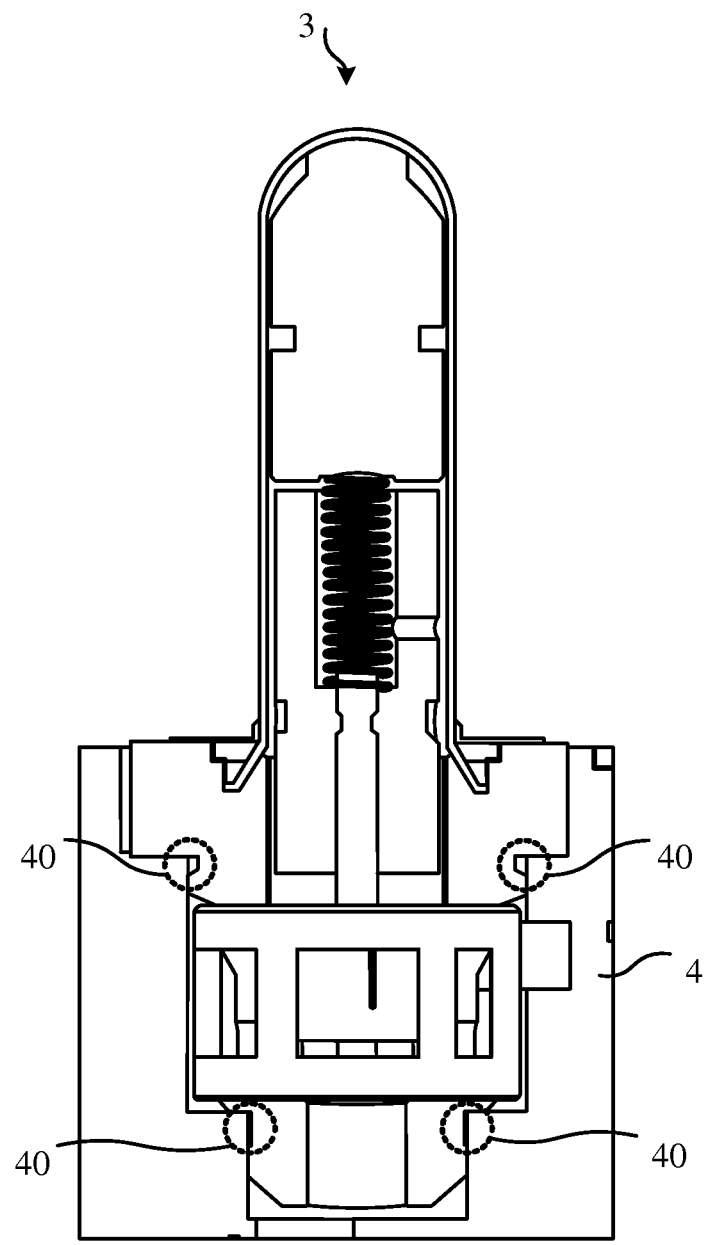
FIG. 6 is a cross-sectional view of a traction control valve according to the second embodiment of the present invention.

Referring to FIG. 6, show is a traction control valve 3 according to a second embodiment of the present invention. A connection portion 30 of the traction valve 3 can be connected to a connective portion 40 of a body 4. The body 4 is substantially identical to body 20 and therefore will not be described in detail. The connective portion 30 of the traction control valve 3 may be an annular groove. As the traction control valve 3 is inserted in the body 4, the body 4 is pressed and turned to so that plastics of the body 4 is deformed in pressed into the annular groove 30.

Figure 7:
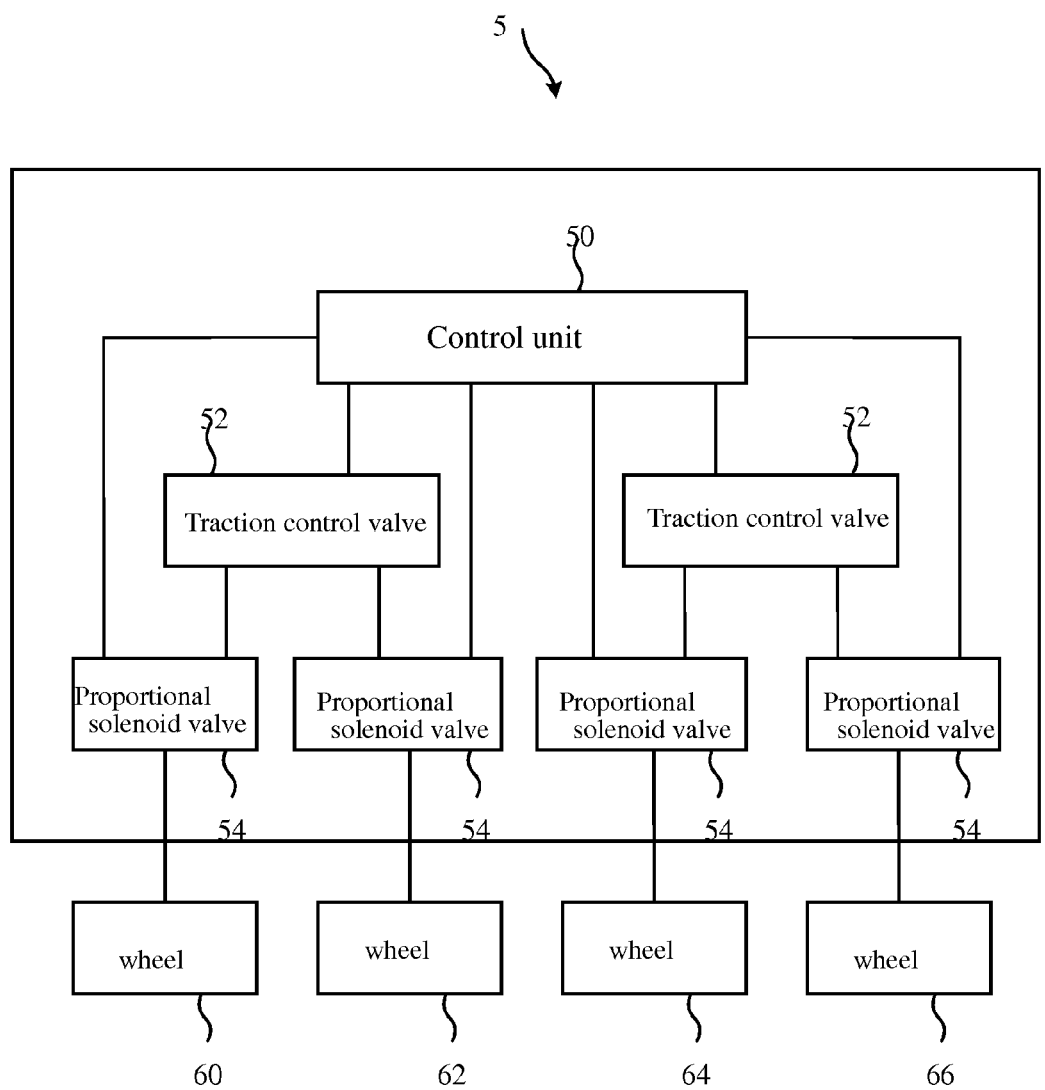
FIG. 7 is a block diagram of a hydraulic brake system according to the third embodiment of the present invention.

Referring to FIG. 7, shown is a hydraulic brake system according to a third embodiment of the present invention. The hydraulic brake system includes a control unit 50, two traction control valves 52 and four proportional solenoid valves 54. The control unit 50 is connected to traction control valves 52. Each of the traction control valves 52 is connected to two related ones of the proportional solenoid valves 54. The control unit 50 of the hydraulic brake system 5, under the control of a driver, controls the traction control valves 52 and the proportional solenoid valves 54 to activate a rear right brake 60, a front left 62, a rear left brake 64 and a front right brake 66.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A hydraulic brake system including:
a body including an upper face,
cavities defined in the upper face, and
two halves, each half including a vacuum brake booster port defined therein, a first caliper port defined therein, an accumulator located in a first one of the cavities, a first proportional solenoid valve located in a second one of the cavities and including an upper channel, a middle channel connected to the first caliper port, and a lower channel, a traction control valve located in a third one of the cavities and including an upper channel, a middle channel connected to the vacuum brake booster port, and a lower channel connected to the first proportional solenoid valve, and a channel system defined in the body and connected to the accumulator, the first proportional solenoid valve and the traction control valve via the first, second and third cavities, wherein the channel system is further connected to the vacuum brake booster port and the first caliper port, wherein the vacuum brake booster port, the accumulator, the first proportional solenoid valve, the traction control valve and the channel system are used together to control brake fluid to exert a first baking force on the first caliper port, a second proportional solenoid valve located in a fourth one of the cavities and including an upper, a middle, and a lower channel so that the channel system is connected to the second proportional solenoid valve via the fourth cavity, and a second caliper port connected to the channel system and to the middle channel of the second proportional solenoid valve, wherein the vacuum brake booster port, the accumulator, the second proportional solenoid valve, the traction control valve and the channel system can be used together to control the brake fluid to exert a second braking force on the second caliper port.

2. The hydraulic brake system according to claim 1, wherein the first and second caliper ports are located on different faces of the body.

3. The hydraulic brake system according to claim 1, further including a motor located in the body and a pump located in the body and connected to the motor and the accumulator, wherein the motor drives the pump to suck the brake fluid from the accumulator based on an operative mode of the hydraulic brake system.

4. The hydraulic brake system according to claim 3, further including a vibration damper chamber defined in the body, wherein the vibration damper chamber is connected to the pump and the channel system, wherein the pump pumps the brake fluid into the vibration damper chamber and from the vibration damper chamber into the channel system.

5. The hydraulic brake system according to claim 1, wherein the first proportional solenoid valve includes a thread engaged with a thread formed on a wall of the second cavity.

6. The hydraulic brake system according to claim 1, wherein the traction control valve includes a thread engaged with a thread formed on a wall of the third cavity.

\* \* \* \* \*